(12) United States Patent
Lyons et al.

(10) Patent No.: US 10,018,456 B2
(45) Date of Patent: Jul. 10, 2018

(54) MULTIFUNCTIONAL AERODYNAMIC, PROPULSION, AND THERMAL CONTROL SYSTEM

(71) Applicant: Raytheon Company, Waltham, MA (US)

(72) Inventors: Paul M. Lyons, Tucson, AZ (US); Jeremy C. Danforth, Tucson, AZ (US); Jeff L. Vollin, Tucson, AZ (US); Matt H. Summers, Marana, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 214 days.

(21) Appl. No.: 14/936,760

(22) Filed: Nov. 10, 2015

(65) Prior Publication Data

US 2017/0131078 A1    May 11, 2017

(51) Int. Cl.
| | |
|---|---|
| *F25B 19/00* | (2006.01) |
| *F42B 15/34* | (2006.01) |
| *F25B 9/02* | (2006.01) |
| *B64D 27/00* | (2006.01) |
| *B64G 1/40* | (2006.01) |

(52) U.S. Cl.
CPC .............. *F42B 15/34* (2013.01); *B64D 27/00* (2013.01); *B64G 1/40* (2013.01); *F25B 9/02* (2013.01); *F25B 19/005* (2013.01)

(58) Field of Classification Search
CPC .............................. B60H 1/3202; F25B 19/00
USPC .................. 62/324.1, 498, 613, 611, 51.2, 7
See application file for complete search history.

(56) References Cited

U.S. PATENT DOCUMENTS

| | | | | |
|---|---|---|---|---|
| 4,275,734 A | * | 6/1981 | Mitchiner | A61B 18/02 606/23 |
| 4,819,451 A | | 4/1989 | Hingst | |
| 5,560,362 A | * | 10/1996 | Sliwa, Jr. | A61B 8/546 600/439 |

(Continued)

FOREIGN PATENT DOCUMENTS

| | | |
|---|---|---|
| DE | 199 42 834 A1 | 3/2001 |
| GB | 1 304 348 | 1/1973 |

OTHER PUBLICATIONS

International Search Report and Written Opinion of the International Searching Authority for corresponding International Application No. PCT/US2016/040426 dated Sep. 23, 2016.

*Primary Examiner* — Melvin Jones
(74) *Attorney, Agent, or Firm* — Renner, Otto, Boisselle & Sklar, LLP.

(57) ABSTRACT

An open-loop thermal control system and method for components that generate heat includes a reservoir for containing a pressurized working fluid, a first heat exchanger in thermal communication with the working fluid, a Joule-Thomson expansion valve in fluid communication with the reservoir, and a second heat exchanger in fluid communication with the valve. The first heat exchanger is configured to transfer heat from the components to the fluid in the reservoir. The valve is configured to expand the working fluid into a two-phase fluid having a primary use of cooling. The second heat exchanger is configured to receive heat from the components and receive the two-phase fluid. The second heat exchanger provides a single-phase working fluid for at least one secondary use before the working fluid is expelled from the thermal control system.

14 Claims, 3 Drawing Sheets

(56) References Cited

U.S. PATENT DOCUMENTS

| | | |
|---|---|---|
| 8,572,948 B1 | 11/2013 | Pinera |
| 8,683,824 B2 * | 4/2014 | Madison ............... F16K 11/074 62/51.2 |
| 8,937,482 B1 * | 1/2015 | Lemczyk ........... G01R 31/2862 324/750.04 |

* cited by examiner

MULTIFUNCTIONAL AERODYNAMIC, PROPULSION, AND THERMAL CONTROL SYSTEM

FIELD OF THE INVENTION

The invention relates to thermal control systems, and more particularly to thermal control systems in air vehicles.

DESCRIPTION OF THE RELATED ART

Various applications have thermal environments. In certain applications, such as in air flight vehicles, the thermal environment includes internal electronics used for operating the air flight vehicle. The energy generated from operating the electronics may overheat the thermal environment and the electronics contained within the environment. Furthermore, in some applications, the energy is not easily dissipated from the thermal environment. In certain applications, functions such as electrical power generation, airframe cooling, active aerodynamics, and propulsion are also required and compete for the same space as the thermal control system.

SUMMARY OF THE INVENTION

According to an aspect of the invention, an open-loop thermal control system for components that generate heat includes: a reservoir for containing a pressurized working fluid; a first heat exchanger in thermal contact with the working fluid; a Joule-Thomson expansion valve in fluid communication with the reservoir; and a second heat exchanger in fluid communication with the valve. The first heat exchanger is configured to transfer heat from the components to the working fluid to maintain a near constant pressure. The valve is configured to expand the working fluid into a two-phase fluid having a primary use of cooling. The second heat exchanger is configured to exchange heat with the components and receive the two-phase fluid. The second heat exchanger provides a single-phase fluid as the working fluid for at least one secondary use before the working fluid is expelled from the thermal control system.

The second heat exchanger may include a cold plate for cooling the components.

The reservoir may include a cold plate for maintaining pressure in the reservoir when the thermal control system is actuated.

The working fluid may be a saturated liquid at room temperature.

The thermal control system may be in a flight vehicle. The flight vehicle may contain electronics and the primary use of the working fluid may be cooling the electronics.

The flight vehicle may have a turbine in fluid communication with the second heat exchanger, and the secondary use of the working fluid may be operating the turbine to provide electrical power. The flight vehicle may have an airframe and the secondary use of the working fluid may be cooling the airframe or preventing aero heating of the airframe.

The flight vehicle may have active aerodynamics and the secondary use of the working fluid may be to provide a gas for improved aerodynamics. The flight vehicle may include a pneumatic system and the secondary use of the working fluid may be to provide gas for the pneumatic system.

According to another aspect of the invention, a method of thermal control using an open loop system includes: providing a pressurized working fluid; expanding the working fluid into a two-phase fluid; performing a cooling function using the two-phase fluid; and converting the two-phase fluid into a single-phase fluid; and performing at least one secondary use with the single-phase fluid.

The method may further include expelling the working fluid from the open loop system.

According to still another aspect of the invention, a method of thermally controlling a flight vehicle having a body containing electronics includes: providing a pressurized working fluid; expanding the working fluid into a two-phase fluid; cooling the electronics with the two-phase fluid; converting the two-phase fluid into a single-phase fluid; and performing at least one secondary use with the single-phase fluid; and expelling the working fluid from the body of the flight vehicle.

Performing at least one secondary use may include supplying working fluid to a turbine of the flight vehicle and operating the turbine to generate electrical power.

Performing at least one secondary use may include supplying the working fluid to a thruster of the flight vehicle to propel the flight vehicle.

Performing at least one secondary use may include blowing the working fluid out of the flight vehicle to reduce a base drag of the flight vehicle.

Performing at least one secondary use may include cooling an internal or external portion of an airframe of the flight vehicle.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

An open-loop thermal control system has a reservoir for containing a pressurized working fluid, a first heat exchanger in thermal communication with the working fluid in the reservoir, a Joule-Thomson expansion valve in fluid communication with the reservoir, and a second heat exchanger in fluid communication with the valve. The valve is configured to expand the working fluid into a two-phase fluid having a primary use of cooling. The first heat exchanger is configured to transfer heat from a source to the fluid in the reservoir. The second heat exchanger is configured to receive the two-phase fluid and provide a single-phase working fluid for at least one secondary use before the working fluid is expelled from the thermal control system.

The second heat exchanger is configured to exchange heat with components that generate heat and need thermal control.

Figure 1:
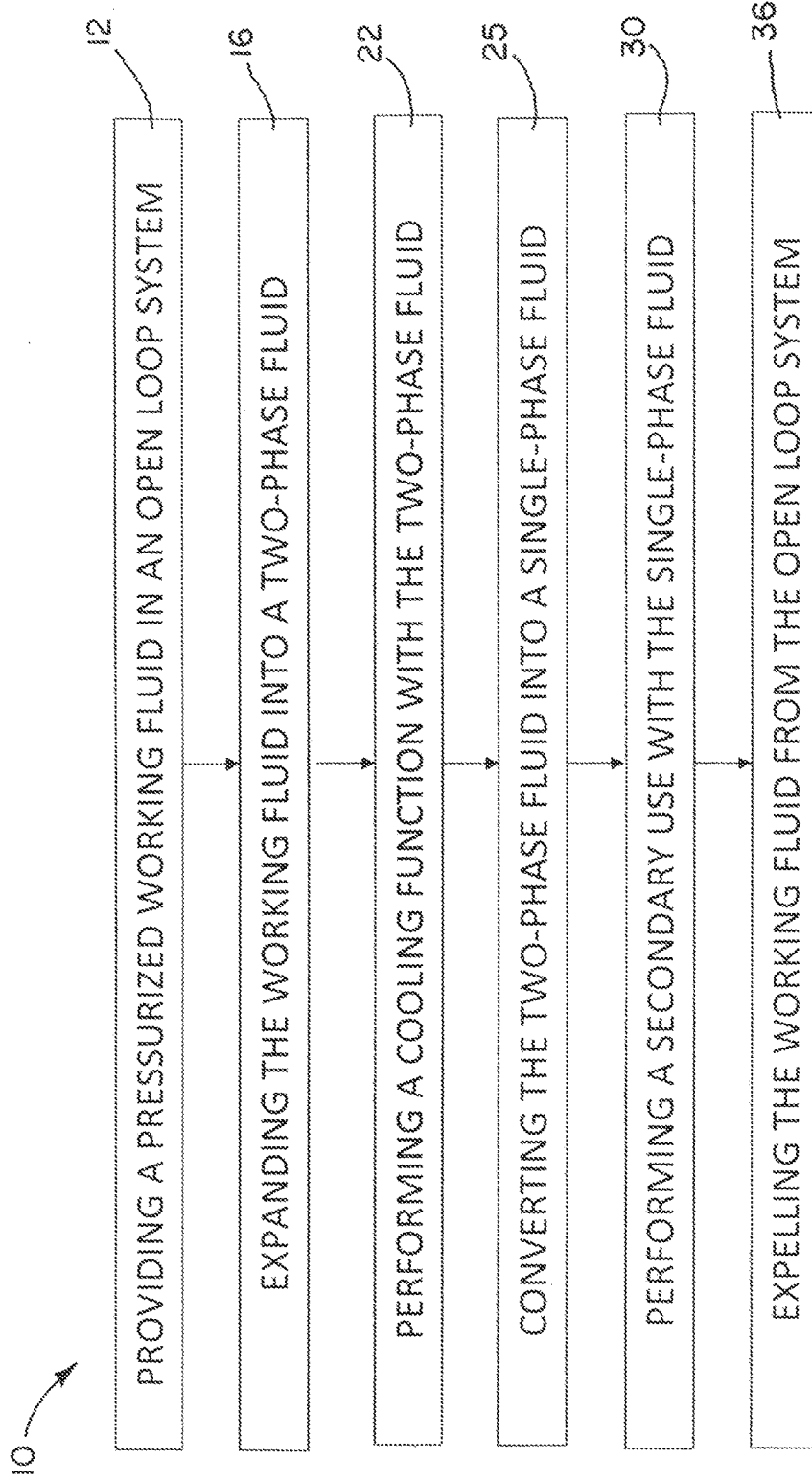
FIG. 1 is a flowchart showing an exemplary method of thermal control using an open-loop thermal control system in accordance with an exemplary embodiment of the present invention.
Figure 2:
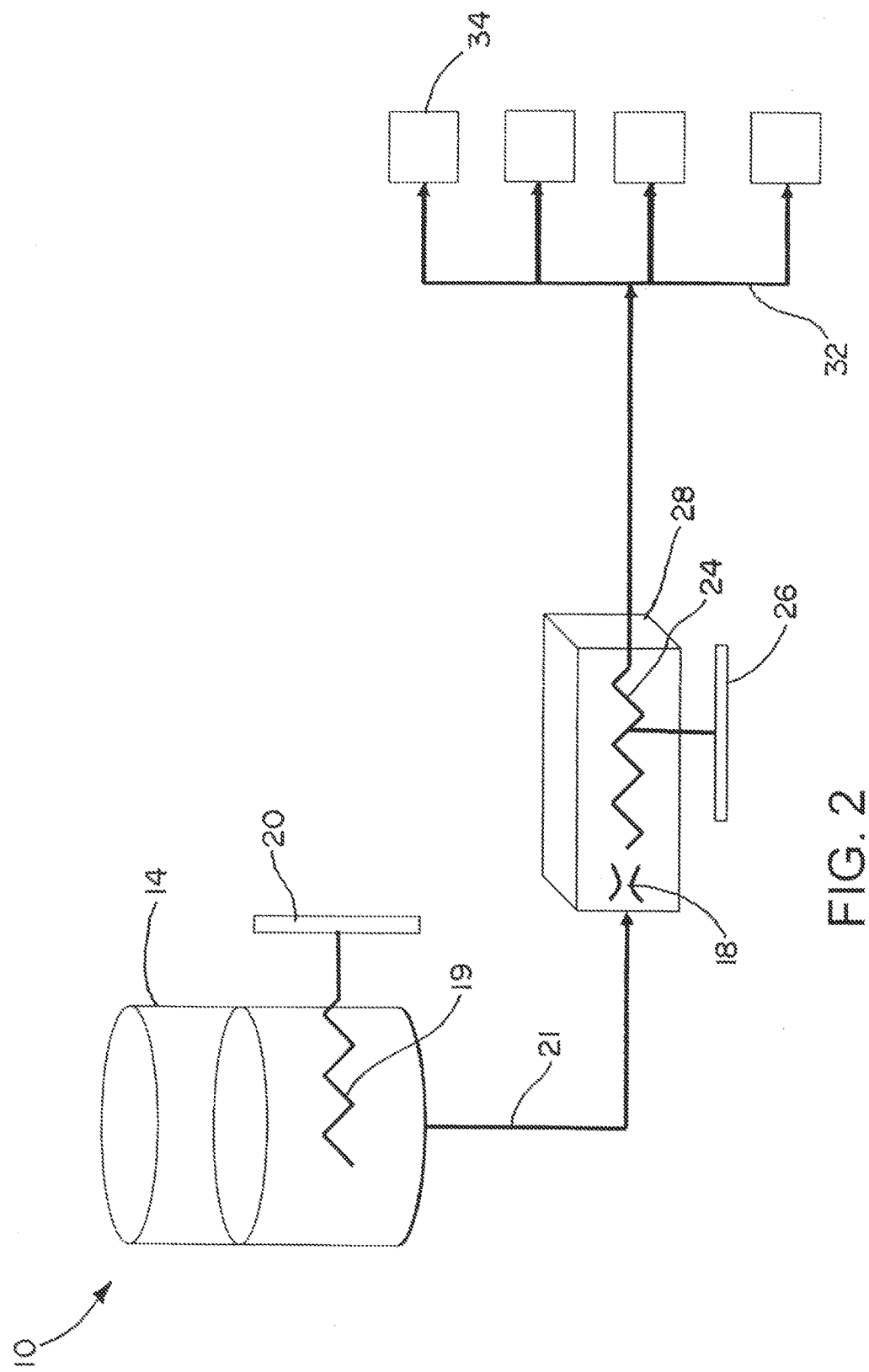
FIG. 2 is a schematic of the thermal control system of FIG. 1.

FIG. 1 is a flowchart showing an exemplary method of thermal control for components generating heat using an open-loop thermal control system 10. FIG. 2 is a schematic drawing of the thermal control system 10. The first step 12 in the method is providing a pressurized working fluid. The thermal control system 10 includes a reservoir 14 for containing the working fluid. The reservoir 14 may be a high pressure bottle and the working fluid may be any suitable fluid or gas for a particular application, such as a saturated fluid at room temperature. Examples of suitable fluids are nitrous oxide, carbon dioxide, and 1,1,1,2-tetrafluoroethane. The reservoir 14 may be filled with the working fluid and initially sealed, such that the reservoir 14 may store the working fluid until actuation of the thermal control system 10.

The second step 16 in the method is expanding the pressurized working fluid into a cold two-phase fluid. The thermal control system 10 is actuated by releasing the working fluid from the reservoir 14 towards a Joule-Thomson expansion valve 18. To maintain near constant pressure of the working fluid within the reservoir 14, heat may be applied to the reservoir 14. The thermal control system 10 may include a first heat exchanger 19 to transfer heat to the working fluid after actuation of the thermal control system 10. A cold plate 20 may be attached to the first heat exchanger 19 to provide a mounting platform for the components that generate heat and need to be cooled. The valve 18 may be in fluid communication with the reservoir 14 via a fluid passage 21 and the fluid passage 21 may be located at a bottom end of the reservoir 14, where the working fluid is drained using gravity as the phase separation method if a saturated liquid is used. The thermal control system 10 may be actuated by using an actuator, such as a squib (not shown).

The Joule-Thomson expansion valve 18 is configured to expand the working fluid into a cold two-phase fluid. When the compressed fluid is supplied to the valve 18, the working fluid is cooled via isenthalpic expansion, or the Joule-Thomson effect, and produces the two-phase fluid. The valve 18 may be a simple orifice, a porous plug, a capillary tube, or any mechanism that allows isenthalpic expansion. The two-phase fluid may contain a liquid phase and a gas phase, and the flow of the fluid may be maintained at a near constant rate. After the valve 18 expands the working fluid into the two-phase fluid, the working fluid is used for a primary use of cooling. Performing the cooling function with the two-phase fluid is the third step 22 in the method of thermal control of FIG. 1.

After expansion through the valve 18, the two-phase fluid absorbs heat as it flows through a second heat exchanger 24. The fourth step 25 in the method of thermal control is converting the two-phase fluid into a single-phase fluid. This occurs by way of the working fluid flowing through the second heat exchanger 24 such that the energy of the working fluid increases primarily by constant temperature vaporization of the liquid phase. In the art, the second heat exchanger 24 may be called an evaporator. Once sufficient heat is added to the fluid to cause it to be a single phase gas, additional heat may be added to raise its temperature. In an exemplary application, the heat added to the fluid comes from a source that needs its temperature to be controlled.

The second heat exchanger 24 may be in thermal communication with a cold plate 26 as an attachment platform of the components to be cooled. The second heat exchanger 24, the valve 18, and the cold plate 26 may be located in a common housing 28. The valve 18 is in fluid communication with the second heat exchanger 24 within the housing 28 via various fluid passages contained within the housing 28 (not shown). The gas leaving the second heat exchanger 24 may have a reduced pressure relative to the pressure of the working fluid entering the second heat exchanger 24 but will have a pressure higher than the ambient pressure in the system. This higher than ambient pressure provides potential energy for at least one secondary use.

The fifth step 30 in the method is performing a secondary use with the single-phase fluid. The secondary use may include a plurality of secondary uses and may include at least one of producing electrical power, providing cold gas propulsion, providing the working fluid as an oxidizer for hot gas propulsion, providing a fluid for other thermal isolation or cooling methods, and providing a fluid for active aerodynamics. The working fluid may be directed by at least one fluid passage 32 towards a pre-determined location 34 in the thermal control system 10 to perform the secondary uses. After at least one secondary use is performed, the sixth step 36 is expelling the working fluid from the thermal control system 10.

In an exemplary thermal control system 10, the reservoir is approximately 2 liters and contains nitrous oxide as the working fluid. The working fluid may be maintained at an absolute pressure of 680 to 850 pounds per square inch, when the temperature is held constant between 290 and 300 Kelvin. The flow rate of the working fluid through the expansion valve may be kept constant between 1.45 and 1.80 grams per second for a ten minute flight. The thermal control system 10 may have the capacity to capture 395 watts of heat input for a ten minute flight. Of which 80 Watts is input into the reservoir and 315 Watts is input into the second heat exchanger. The working fluid after Joule-Thomson expansion may be maintained at an absolute pressure near 300 pounds per square inch and the temperature of the working fluid leaving the heat exchanger may be between 260 and 270 Kelvin. This single phase gas at 300 pounds per square inch and near ambient temperature may be used to power a turbine to produce auxiliary power for the aircraft, or used as an oxidizer for a propellant, or used as a source of film or transpiration cooling, or used for methods of enhanced aerodynamics.

When carbon dioxide is used as the working fluid in the reservoir, for example, the working fluid may be maintained at an absolute pressure of 770 to 970 pounds per square inch, when the temperature is held constant between 290 and 300 Kelvin. The flow rate of the working fluid through the expansion valve may be kept constant between 1.28 and 1.62 grams per second for a ten minute flight. The thermal control system 10 may have the capacity to capture 360 watts of heat input for a ten minute flight, off which 85 Watts is input into the reservoir and 275 Watts is input into the second heat exchanger. The working fluid after Joule-Thomson expansion may be maintained at an absolute pressure near 300 pounds per square inch and the temperature of the working fluid leaving the heat exchanger may be between 260 and 270 Kelvin. This single phase gas at 300 pounds per square inch and near ambient temperature may be used to power a turbine to produce auxiliary power for the aircraft, or used as a cold gas propellant, or used as a source of film or transpiration cooling, or used for methods of enhanced aerodynamics. A wide variety of variations of the thermal control system 10 are possible, and the specific features of the illustrated embodiments (using nitrous oxide or carbon dioxide as the working fluid, for example) should not be considered as necessary essential features.

Figure 3:
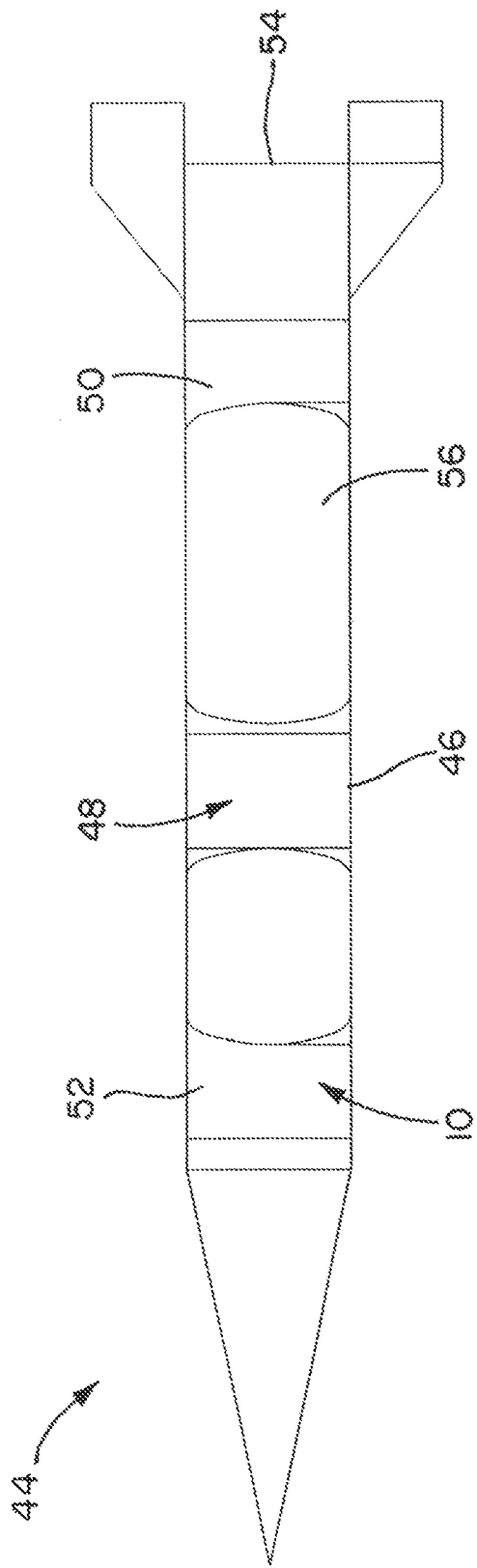
FIG. 3 is a schematic of the thermal control system of FIG. 2 implemented in a flight vehicle.

Referring now to FIG. 3, the open-loop thermal control system 10 may be used in a flight vehicle 44 having a body 46. The body 46 may contain electronics 48 for operating the flight vehicle 44, such that the body 46 is a contained thermal environment. The flight vehicle 44 may be used in hypersonic applications and other applications where heat generated in the airframe cannot be readily dissipated to the skin. The thermal control system 10 may be used to ensure thermal survivability of flight vehicle components such as the electronics 48, seekers, aero surfaces, and other components. The thermal control system 10 may also be used in the flight vehicle 44 for systems that provide electrical power, propulsion, range extension, or increased terminal velocity.

The thermal control system 10 is operable during flight of the flight vehicle 44. The two-phase fluid is used for the primary use of cooling the electronics 48 within the body 46 of the flight vehicle 44. During cooling, the two-phase fluid absorbs heat from the electronics 48 within the body 46. After the two-phase fluid has been converted into a single-phase gas, the working fluid is suitable for at least one parallel use, or secondary use, before being expelled from the vehicle 44. The working fluid may be used for more than one secondary use and the secondary uses may include any use that is a suitable use of the working fluid in the flight vehicle 44.

Examples of the secondary use may include supplying working fluid to a component of the flight vehicle 44 to actuate or operate the component. The flight vehicle 44 may include a turbine 50 that is in fluid communication with the thermal control system 10. The secondary use of the working fluid may include operating the turbine 50 to provide electrical power for the flight vehicle 44. The flight vehicle 44 may also include an airframe 52 and another secondary use may include supplying the working fluid to the airframe 52 to cool the airframe 52. The cooling may occur internal or external to the airframe 52. The airframe 52 may include an infrared window, and the secondary use of the working fluid may include film or transpiration cooling of the window.

Still another secondary use may include reducing a base drag of the flight vehicle 44. The thermal control system 10 may be in fluid communication with a rear component 54 of the airframe 52 for blowing gas out of the rear component 54 and lowering the aerodynamic drag of the flight vehicle 44. Reducing the base drag may improve terminal velocity and increase the projectile range of the flight vehicle 44.

The flight vehicle 44 may also include a secondary jet or thruster 56 in fluid communication with the thermal control system 10. The secondary use may include supplying the working fluid to the thruster 56 to propel the flight vehicle 44 by way of cold gas propulsion. In the case of a working fluid that is also an oxidizer, nitrous oxide for example, the secondary use may include supplying the working fluid as an oxidizer for a propellant fuel.

The working fluid may be supplied to more than one component of the vehicle 44 to provide more than one secondary use and the secondary uses may occur simultaneously. When the secondary use has been performed, the working fluid is expelled from the body 46 of the flight vehicle 44.

The thermal control system and method has advantages over currently used cooling systems for keeping internal electronics from overheating. The system uses both the expansion of a two-phase fluid in a pressure vessel and the expansion with a Joule-Thomson valve to generate a steady refrigeration capacity while simultaneously providing a steady flow of pressurized gas for other uses such as cold gas attitude control, film or transpiration cooling, base drag reduction, or electrical power generation. The system uses cooling potential that is normally wasted in the blow down of a pressurized vessel or the use of a regulator to perform these functions. The system combines a cooling system with other uses to provide more efficient packaging than would occur if the systems were packaged separately.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An open-loop thermal control system for components that generate heat comprising:
a reservoir for containing a pressurized working fluid;
a first heat exchanger in thermal contact with the working fluid;
a Joule-Thomson valve in fluid communication with the reservoir; and
a second heat exchanger in fluid communication with the valve,
wherein the first heat exchanger is configured to transfer heat from the components to the working fluid to maintain a near constant pressure,
wherein the valve is configured to expand the working fluid into a two-phase fluid having a primary use of cooling, and
wherein the second heat exchanger is configured to receive heat from the components and receive the two-phase fluid, and provide a single-phase fluid as the working fluid for at least one secondary use before the working fluid is expelled from the thermal control system.

2. The thermal control system of claim 1, wherein the second heat exchanger includes a cold plate for cooling the components.

3. The thermal control system of claim 1, wherein the reservoir includes a cold plate for maintaining pressure in the reservoir when the thermal control system is actuated.

4. The thermal control system of claim 1, wherein the working fluid is a saturated liquid at room temperature.

5. The thermal control system of claim 1, wherein the thermal control system is in a flight vehicle.

6. The thermal control system of claim 5, wherein the flight vehicle contains electronics and the primary use of the working fluid is cooling the electronics.

7. The thermal control system of claim 5, wherein the flight vehicle has a turbine in fluid communication with the second heat exchanger, and the secondary use of the working fluid is operating the turbine to provide electrical power.

8. The thermal control system of claim 5, wherein the flight vehicle has an airframe and the secondary use of the working fluid is cooling the airframe.

9. The thermal control system of claim 5, wherein the flight vehicle has an airframe and the secondary use of the working fluid is preventing aero heating of the airframe.

10. The thermal control system of claim 5, wherein the flight vehicle has active aerodynamics and the secondary use of the working fluid is to provide a gas for improved aerodynamics.

11. The thermal control system of claim 5, wherein the flight vehicle includes a pneumatic system and the secondary use of the working fluid is to provide gas for the pneumatic system.

12. A method of thermal control using an open loop system, the method comprising:
provuding a pressurized working fluid;
expanding the working fluid into a two-phase fluid;
performing a cooling function using the two-phase fluid;
converting the two-phase fluid into a single-phase fluid; and
performing at least one secondary use with the single-phase fluid.

13. The method of claim 12 further comprising expelling the working fluid from the open loop system.

14. A method of thermally controlling a flight vehicle having a body containing electronics, the method comprising:
providing a pressurized working fluid;
expanding the working fluid into a two-phase fluid;
cooling the electronics with the two-phase fluid;
converting the two-phase fluid into a single-phase fluid;
performing at least one secondary use with the single-phase fluid that includes:
supplying working fluid to a turbine of the flight vehicle and operating the turbine to generate electrical power,
supplying the working fluid to a thruster of the flight vehicle to propel the flight vehicle,
blowing the working fluid out of the flight vehicle to reduce a base drag of the flight vehicle, or
cooling an internal or external portion of an airframe of the flight vehicle; and
expelling the working fluid from the body of the flight vehicle.

* * * * *